United States Patent [19]
Linz

[11] Patent Number: 5,536,157
[45] Date of Patent: Jul. 16, 1996

[54] APPARATUS FOR COOLING MELT-SPUN FILAMENTS

[75] Inventor: Hans Linz, Kriens, Switzerland

[73] Assignee: EMS-INVENTA AG.G., Domat/EMS, Switzerland

[21] Appl. No.: 259,759

[22] Filed: Jun. 13, 1994

Related U.S. Application Data

[63] Continuation-in-part of Ser. No. 946,484, Nov. 3, 1992, abandoned.

[30] Foreign Application Priority Data

Mar. 4, 1991 [WO] WIPO ............... PCT/CH91/00050

[51] Int. Cl.⁶ .................. B29C 47/88; D01D 5/088
[52] U.S. Cl. .................. 425/72.2; 264/211.12; 264/237; 425/378.2; 425/404
[58] Field of Search ............... 425/72.2, 192 S, 425/378.2, 404; 264/176.1, 236, 237, 205, 210.3, 211.12

[56] References Cited

U.S. PATENT DOCUMENTS

| | | | |
|---|---|---|---|
| 3,299,469 | 1/1967 | Charlton | 425/72.2 |
| 4,038,357 | 7/1977 | Boyes et al. | 264/237 |
| 4,288,207 | 9/1981 | Wilkes | 425/72.2 |
| 4,332,764 | 6/1982 | Brayford et al. | 425/72.2 |
| 4,340,341 | 7/1982 | Cardell | 425/72.2 |
| 4,514,350 | 4/1985 | Roth et al. | 425/72.2 |
| 4,756,679 | 7/1988 | Stibal et al. | 425/72.2 |
| 4,988,270 | 1/1991 | Stibal et al. | 425/72.2 |

FOREIGN PATENT DOCUMENTS

| | | |
|---|---|---|
| 678433 | 9/1991 | Switzerland . |
| 957534 | 5/1964 | United Kingdom . |
| 2180499 | 4/1987 | United Kingdom . |

Primary Examiner—Jay H. Woo
Assistant Examiner—Joseph Leyson
Attorney, Agent, or Firm—Michael J. Striker

[57] ABSTRACT

The apparatus for cooling, stabilizing and preparing melt-spun filaments includes a spinneret assembly for producing an annular bundle of filaments; a blowing air dispensing device downstream of the spinneret assembly and centrally located in the annular bundle for cooling the melt-spun filaments; a hollow, air-conducting preparation application device located centrally in the annular bundle and downstream of the blowing air dispensing device; a radially closed hollow cylindrical tube having open ends and connecting the blowing air dispensing device and the preparation application device to conduct air flowing through the preparation application device to the blowing air dispensing device and having a length of from 200 to 2000 mm and a controlling device for regulating the spinning speed and filament denier so that the product of the spinning speed and the square root of the filament denier is between 5000 and 20000 (m/min dtex$^{1/2}$) to produce cooled prepared filaments with a birefringence not varying from a mean value by more than about 10%.

8 Claims, 2 Drawing Sheets

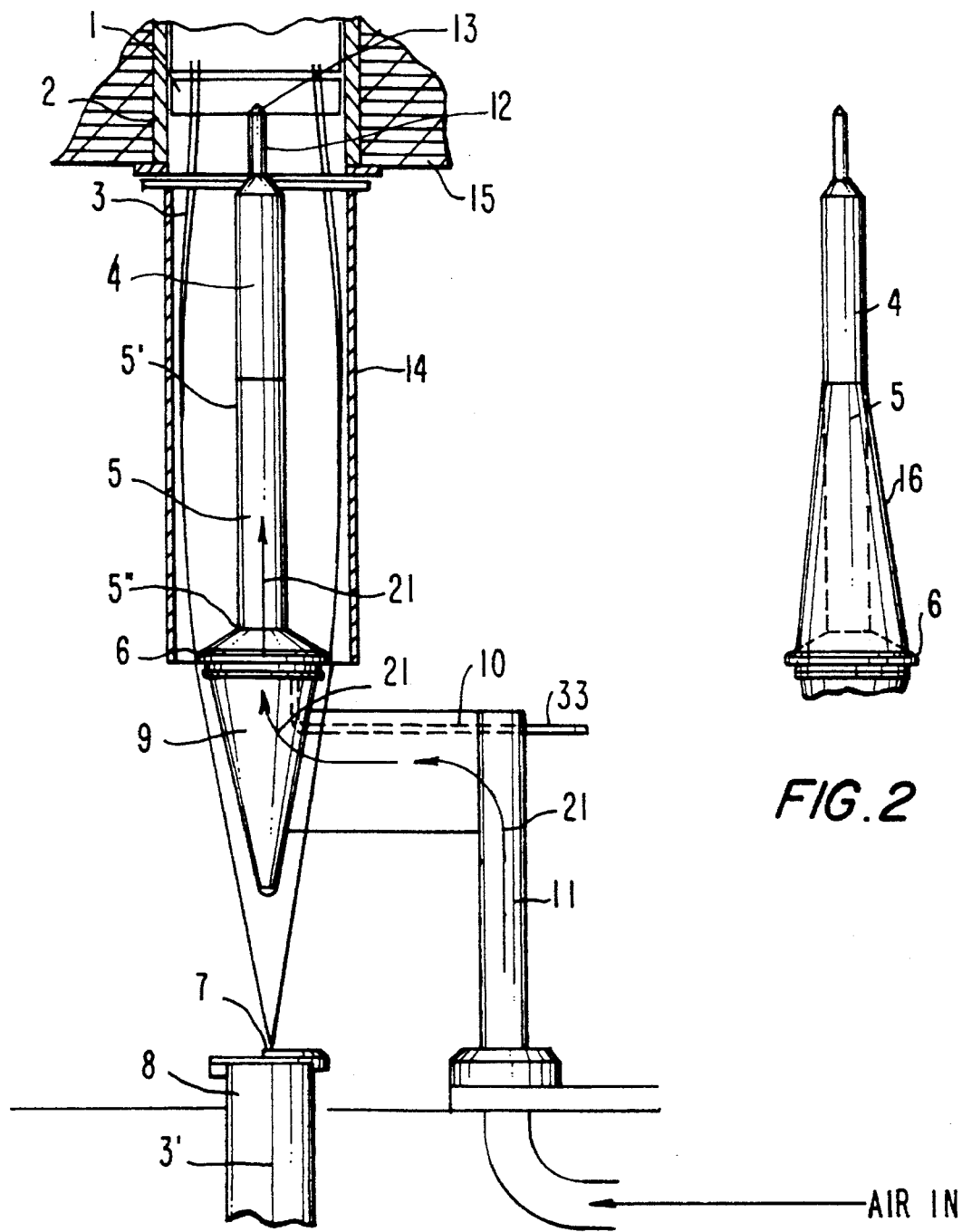

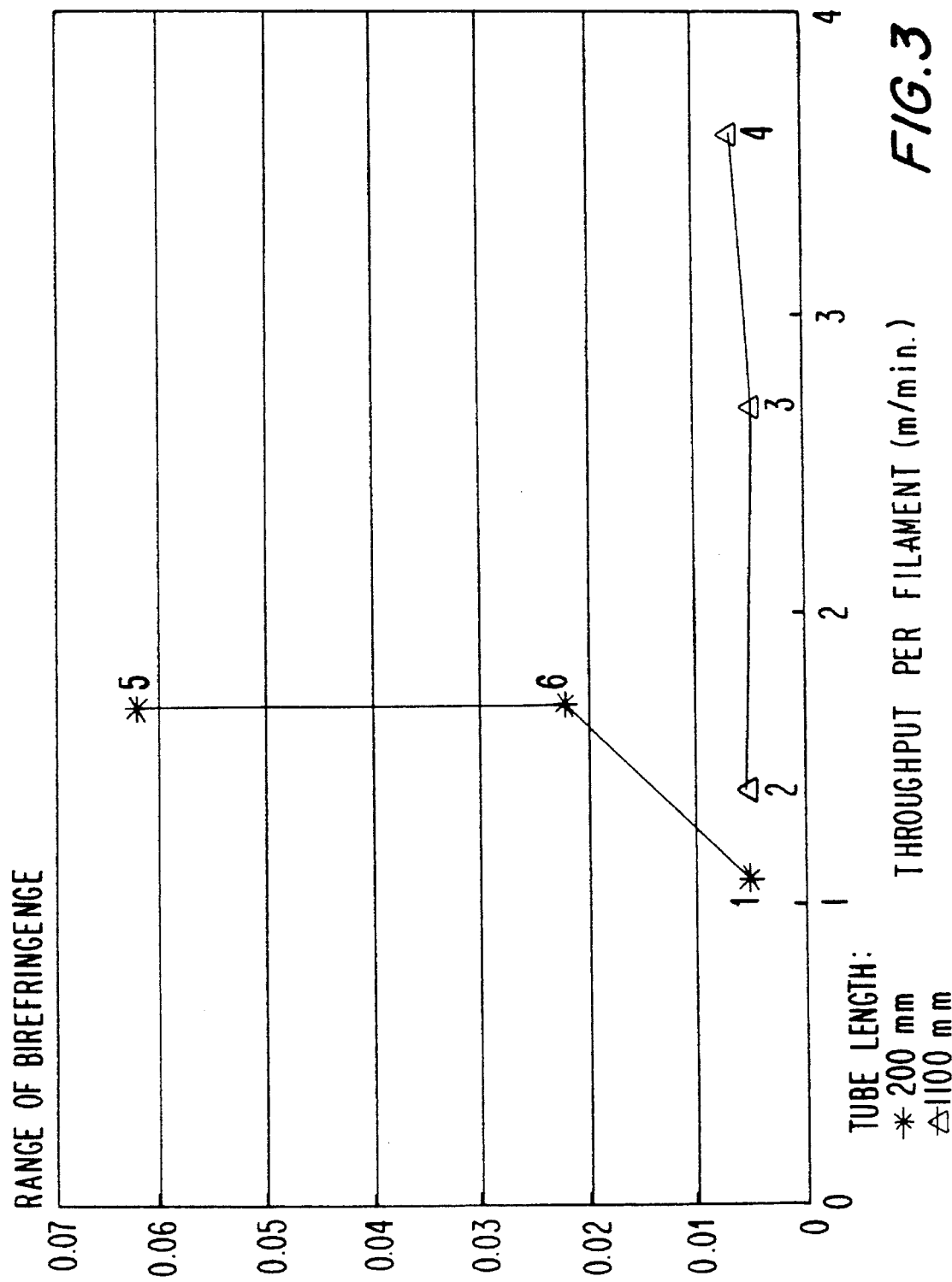

APPARATUS FOR COOLING MELT-SPUN FILAMENTS

The present invention is a continuation-in-part of U.S. patent application, Ser. No. 07/946,484, filed Nov. 3, 1992, now abandoned.

BACKGROUND OF THE INVENTION

The present invention relates to an apparatus for cooling, stabilizing and preparing melt-spun filaments.

A known apparatus for cooling, stabilizing and preparing melt-spun filaments includes means for making an annular bundle of melt-spun filaments, a blowing air dispensing means arranged in the center of the annular bundle of melt-spun filaments and a preparation application device for applying a preparation to the filaments.

Swiss Patent CH-A-667,676 discloses a porous blowing air dispensing means which is positionable in the center of an annular bundle of filaments downstream of a melt jet and which feeds gas radially symmetrically through the bundle of filaments from the interior of the bundle to the exterior. In this way, the heat from the melt jet is efficiently removed from the filaments. A preparation can thus be applied directly to the filaments underneath the blowing air dispensing means and the filaments can then be combined to form a closed bundle. Adhesions between the individual filaments do not occur.

It has, however, been shown that this known apparatus cannot be used for all cases. When spinning multifilament yarns, for example yarns made of polyethylene terephthalate (PET), with relatively high individual filament denier, in particular at spinning speeds of 2000 m/min and more, yarns are obtained which cannot be further processed in the conventional manner, in particular stretched. The stretching process is disturbed so much by the occurrence of an intolerable number of filament breakages that a yarn with adequate mechanical properties cannot be produced.

It has been shown that the multifilament yarns spun in this way have very great irregularities in their molecular structure. The values determined for the optical birefringence, as a measure of the molecular orientation, are subject to unusually great variations, both from filament to filament and along the individual filaments, and in each case cover a very wide range.

However, the requirement for regularity of continuous multifilament yarn is so high that, for example, in the case of filaments of polyethylene terephthalate, values for optical birefringence should not vary by more than 10% of the measured mean value. When stretching filaments which have more than a 10% variation in birefringence, an intolerable number of filament breakages is indicated. Moreover, such irregular filaments when present in textiles cause unsatisfactory color intensity variations during dyeing of the textiles.

SUMMARY OF THE INVENTION

It is an object of the present invention to provide an apparatus for cooling and solidifying a melt-spun multifilament yarn in such a way that the molecular orientation within the individual filaments is sufficiently uniform, preferably so that the birefringence does not vary more than 10% from a mean value, so that the melt-spun multifilament yarn is suitable for commercial applications in which it is stretched.

It is an additional object of the invention to provide an improved apparatus for cooling and solidifying a melt-spun multifilament yarn which produces multifilament yarn at a comparatively higher throughput with sufficiently uniform filaments so that it is suitable for commercial applications.

According to the invention, the apparatus for cooling, stabilizing and preparing melt-spun filaments includes means for producing an annular bundle of filaments, e.g. a spinneret assembly or melt jet; blowing air dispensing means for blowing air through the annular bundle of filaments to cool the filaments; a preparation application device downstream of the blowing air dispensing means having means for conducting air for the blowing air dispensing means through it, and a radially closed tube having open ends connecting the blowing air dispensing means and the preparation application device to conduct air fed through preparation application device to the blowing air dispensing means and to space the preparation application device from the blowing air dispensing means. The preparation application device, the radially closed tube and the blowing air dispensing means are concentrically positioned relative to each other in the annular bundle of filaments. The radially closed tube necessarily has a length of 200 to 2000 mm. The radially closed tube is hollow or has a throughgoing passage extending from one open end to the other open end which connects to a hollow interior portion or passage of the blowing air dispensing means which, in turn, is connected with means for dispensing blowing air, e.g. orifices, so that air passed through the radially closed tube issues from the blowing air dispensing means. The preparation application device can, of course, also be provided with a passage for the flowing air as the air-conducting means.

By inserting a radially closed tube between the preparation application device and the blowing air dispensing means, the distance between the blowing orifices and the preparation application device for the preparation agent is increased. This has the advantage that additional time is provided for cooling of the melt-spun filaments. This becomes more important as the individual filaments become thicker and the spinning take-off speed becomes higher. It is therefore better if the distance is increased between the spinneret and the first filament-guiding member with which the freshly spun filament comes into contact when the filament denier is larger or the take-off speed is higher. In this case, the denier which the filament has during the cooling phase is of significance.

It is advantageous when the distance between the beginning of the quenching and the place of preparation application is at least 950 mm. Since, for design reasons, the preparation application device itself extends upstream 220 mm beyond the point at which the preparation is actually applied, it has proven advantageous to provide a tube of at least 200 mm in length between the blowing air dispensing means and the preparation application device.

It is advantageous when the radially closed tube connecting the blowing air dispensing means and the preparation application means is surrounded by a conical casing tapering toward the upstream direction, i.e. away from the preparation application device and toward the blowing air dispensing means. As a result, the cooling air is directed quantitatively, continuously and turbulence-freely out of the interior of the cylindrical bundle of filaments to the exterior.

Depending on the type of polymer, the denier and the speed of the spun filament, the length of this radially closed hollow tube should be between 200 to 2000 mm, in particular between 200 and 1780 mm, preferably between 200 and 1160 mm.

Higher filament denier and higher spinning speeds require greater distances between the blowing air dispensing means and the place of preparation application than lower deniers and speeds. The same applies to substances of higher heat content. Under certain circumstances, this results in pipe lengths with which the mechanical stabilization of the cylindrical bundle of filaments becomes problematical. It is known that the longer the free bundle of filaments is, the greater is the disturbing effect of an external air flow.

Since, however, the cooling conditions require certain minimum lengths, suitable measures for eliminating, or at least reducing to a sufficient extent, the disturbing influences of external air flow must be provided. It is therefore desirable to surround the quenching device or blowing air means with a fixed casing, which in a preferred design comprises a perforated cylindrical tube or pipe which can be made from perforated plate. This cylindrical casing can advantageously extend from the lower edge of the spinneret assembly or heating collar, if there is one, to the vicinity of the preparation application device. Both at the upper end and at the lower end of this casing a predetermined spacing between the casing and the spinneret assembly or heating collar and/or between the casing and the preparation application device can be provided to create a controlled air exchange with the surroundings.

The casing is advantageously designed so that one portion of it can be swung out to the rear and another portion can be swung out to the front. The former is required to clear the required path for removal of the blowing air device or quenching air dispenser from its operating position. Thus the spinning chamber can be opened for operating personnel, for example when starting spinning, to pass the filament down from the spinning stick into the space thereunder with the draw-off apparatus.

It is expedient to provide a centering mandrel on the blowing air device which engages in a bore made in the center of the spinneret assembly. This gives the entire blowing device an additional fixing point and consequently makes it independent of the base area, which varies with varying bottom loading.

The method according to the invention performed with the above-described apparatus particularly includes controlling the product of the spinning speed v (in m/min) and the square root of the filament denier (in dtex) so that it is between 5000 and 20000, preferably between 5270 and 11000 and spacing the preparation application device a sufficient distance from the blowing air dispensing means. This has the advantage that the melt-spun filaments are given adequate time for cooling before they come into mechanical contact with the preparation application device for the spinning preparation.

According to the invention, the method of cooling, stabilizing and preparing melt-spun filaments, comprises the steps of:

a) making an annular bundle of melt-spun filaments with a melt throughput rate of not less than 1.1 g/min per filament;

b) blowing air through the annular bundle with a blowing air dispensing means located in the center of the annular bundle to form cooled filaments;

c) connecting a hollow air-conducting preparation application device to the blowing air dispensing means with a radially closed hollow tube having open ends and a length of from 200 to 2000 mm to space the hollow preparation application device from the blowing air dispensing means;

d) guiding the air to the blowing air dispensing means through the radially closed hollow tube with open ends and the hollow air-conducting preparation application device;

e) applying a preparation agent to the cooled filaments with the preparation application device to form cooled prepared filaments; and f) controlling a spinning speed of the melt-spun filaments and a filament denier of the melt-spun filaments so that the product of the spinning speed and the square root of the filament denier is between 5000 and 20000 (m/min dtex$^{1/2}$) to produce the cooled prepared filaments with a birefringence not varying from a mean value by more than about 10%.

BRIEF DESCRIPTION OF THE DRAWING

The objects, features and advantages of the present invention will now be illustrated in more detail by the following detailed description, reference being made to the accompanying drawing in which:

FIG. 1 is a schematic partially cross-sectional, partially side view of one embodiment of an apparatus according to the invention;

FIG. 2 is a schematic side view of one portion of an alternative embodiment of an apparatus according to the invention; and FIG. 3 is a graphical illustration of the relationship between the birefringence range of the melt-spun filaments produced by the method of the invention using the apparatus shown in FIG. 1 versus melt throughput per filament for two lengths of the radially closed tube separating the blowing air device and the preparation application device.

DESCRIPTION OF THE PREFERRED EMBODIMENTS

In FIG. 1, the reference numeral 1 denotes a spinneret assembly, the means for making the annular bundle 3 of melt-spun filaments, which is arranged within a heating collar 2. The spinneret assembly 1 and the heating collar 2 are surrounded by an insulation 15. A porous blowing air dispensing means 4, which is hollow and cylindrical in the embodiment shown in FIG. 1, is connected gas-tightly to a hollow radially closed tube 5 which has open ends 5', 5" and which is radially closed and of approximately the same diameter over its entire length. The blowing air dispensing means 4 can be provided with a plurality of throughgoing orifices through which air can stream from its interior to its exterior and through the annular bundle 3 of filaments. The blowing air dispensing means in this embodiment is the blowing air dispensing means 4.

A hollow annular preparation application device 6 for applying a spinning preparation to the filaments is arranged concentrically at the lower end of the radially closed tube 5 and has a passage through it to conduct air for the blowing air dispensing means. The blowing nozzle 4, the radially closed tube 5 connected to it and the hollow, air-conducting preparation application device 6 at the lower end of the tube 5 are carried by a tube cone 9, which is movable, e.g. pivotable, in a way not shown in the drawing. The tube cone 9 is hollow or has a connecting passage connected to the radially closed tube 5 with open-ends 5', 5" so that blowing air can be fed through the tube cone 9 into the interior of the radially closed tube 5 from where it flows into the interior to the blowing air dispensing means 4 to be dispensed through the orifices which have not been shown in detail. The tube cone 9 is further movably connected to the housing via a narrow hollow radially closed connecting pipe 10 also with open ends and subsequently connected to the radially closed open-ended hollow tube 11. The air for the blowing perforated blowing air dispenser tube is fed to the hollow tube cone 9 through the air-conducting tube 11 and the connected air-conducting pipe 10. The entire device which provides the air for cooling the filaments including the blowing air dispensing means 4, the radially closed tube 5, the preparation application device 6 and the tube cone 9 is arranged so that it can be moved completely out of the filament path. Of course a source of pressurized air or pump for supplying the cooling air must be connected to the closed hollow tube 11 to feed the air into it, but that air supply means has not been shown in the drawing.

A mandrel 12 is provided at the upper end of the blowing air dispensing means 4, which engages in a corresponding bore 13 in the center of the spinneret assembly 1 in the operating position of the apparatus. A spinning tube 8 is arranged concentrically under the tube cone 9. A convergence device 7 is attached at the upper end of the spinning tube 8 and brings the filaments together. The blowing air dispensing means 4, the radially closed tube 5 and the preparation application device 6 are surrounded by a casing 14 in operation, which in a preferred design is a perforated cylindrical casing formed from a perforated plate. In another embodiment shown in FIG. 2, the radially closed tube 5 is enclosed in a conical casing 16 which extends up to the preparation application device and improves the air flow around the bundle of filaments.

If it is technically possible, the blowing air dispensing means 4 is also extends up to the spinneret plate. Furthermore, for the purpose of a controlled air exchange with the surroundings, both at the upper end and at the lower end of the casing 14 a defined distance from the spinneret plate or heating collar or from the preparation application device is provided.

In operation, the blowing air dispensing means 4 is supplied with the required cooling air via the open-ended hollow tube 11, the radially closed open-ended hollow pipe 10 connected with the air-conducting tube 11, the hollow tube cone 9 connected with the pipe 10, the hollow preparation application device 6 and the radially closed open-ended tube 5. The cooling air, which flows through all the foregoing air-conducting components connected with the blowing air dispensing device, escapes radially symmetrically from the porous blowing air dispensing means 4. The flow of air is shown in FIG. 1 by arrows 21. The preparation application device 6 is supplied with a suitable spinning preparation via a preparation inlet tube 33 connected to it, which passes through the pipe 10 and tube cone 9 as shown in FIG. 1.

The polymer melt to be spun is discharged in a known way through spinneret bores arranged in concentric circles in the spinneret assembly. First it passes by the heating collar zone 2 in free fall and then passes into the region of the blowing air dispensing means 4, where it is cooled by the emerging cooling air and solidified to form a cooled bundle 3 of filaments.

After passing through an additional zone, defined by the radially closed tube 5, the filaments 3 are provided with a spinning preparation by means of the preparation application device 6. Subsequently, the individual filaments are united conically with the aid of the convergence filament guide 7 to form a closed bundle 3' of filaments and fed through the spinning tube 8 to the filament take-off device (likewise not shown).

The methods of the invention are explained with reference to the following examples and results listed in the table hereinbelow. These examples describe the use of the apparatus of the invention for cooling melt-spun filaments made of polyethylene terephthalate.

EXAMPLE 1

Polyethylene terephthalate granules having a solution viscosity of 114 units, determined in accordance with ISO Standard No. 1628/5-1986 (E), were melted in an extruder and spun into a multifilament at a melt temperature of 289° C. through a spinneret having 128 bores arranged in two concentric circles.

The emerging melt was cooled by the central quenching according to the invention, using 600 cbm/h of air at 35° C. The blowing air dispensing means 4 was 530 mm long with a diameter of 95 mm. The radially closed hollow tube 5 between the blowing air dispensing means 4 and the application apparatus 6 for the preparation had a length of 200 mm and fed blowing air to the blowing nozzle 4 from which it issues radially to the filaments. Accordingly, the place for the application of the preparation was 420 mm below the blowing air dispensing means.

The solidified multifilament was taken off from the spinning chamber at a speed of 3100 m/min. The melt throughput was chosen so that the individual filaments had a denier of 3.6 dtex. The values for optical birefringence measured on this multifilament were in the range between 0.048 and 0.053, i.e. a size range of $5\times10^{-2}$. The molecular orientation of the multifilament was consequently satisfactory for further processing.

EXAMPLES 2 to 4

Polyethylene terephthalate as in Example 1 was spun and cooled in the same way. However, in the case of these examples the length of the tube 5 was 1160 mm, i.e. the application device 6 for the spinning preparation was 1380 mm below the blowing air dispensing means. The melt throughput per spinneret bore was varied in such a way that, at a drawing-off speed of 3100 m/min, multifilaments resulted. The individual filament denier varied from one example to another from 4.5 and 11.5 dtex. In the case of these multifilaments as well, the values for the optical birefringence were within a narrow range of 0.006 units.

EXAMPLE 5

Polyethylene terephthalate was spun as in Example 1 and cooled and solidified under the same conditions. The length of the tube 5 was 200 mm. The take-off or spinning speed was at 2000 m/min. The melt throughput was chosen in such a way that a multifilament of 8.5 dtex individual filament denier results. The values for the optical birefringence found for these filaments were within a range between 0.024 and 0.045.

EXAMPLE 6

Polyethylene terephthalate was spun, cooled and solidified as in Example 1. However, at 3100 m/min, a multifilament of 5.6 dtex individual filament denier was produced. In this case, values for the optical bi-refringence which were within a range of 0.048 to 0.110 were found.

The test results of the examples are compiled in the following table.

TABLE

| | Filament Birefringence Range versus Melt Throughput | | | | | |
|---|---|---|---|---|---|---|
| Example No. | 1 | 2 | 3 | 4 | 5 | 6 |
| Spinning speed, [m/min] | 3100 | 3100 | 3100 | 3100 | 2000 | 3100 |
| Filament denier, [dpf] | 3.6 | 4.5 | 8.8 | 11.5 | 8.5 | 5.6 |
| Melt throughput, [g/min/fil] | 1.1 | 1.4 | 2.7 | 3.6 | 1.7 | 1.7 |
| v-SQR, (dpf) | 5881 | 6576 | 9196 | 10513 | 5831 | 7336 |
| Tube length, [mm] | 200 | 1160 | 1160 | 1160 | 200 | 200 |
| Distance between blowing air dispensing means and preparation, [MM] | 420 | 1380 | 1380 | 1380 | 420 | 420 |
| Birefringence × $10^3$ | | | | | | |
| min | 48 | 50.1 | 51.1 | 48.8 | 23.9 | 48.3 |
| max | 53 | 55.6 | 55.6 | 55.1 | 45.8 | 110.2 |

Filaments according to Examples 1–4 can be further processed, in particular stretched, satisfactorily. The range between the maximum and minimum birefringence values of the filaments is about 10% of the mean value. In the case of the filaments according to Examples 5 and 6, an intolerable number of filament breakages occur during stretching and the range of the birefringence greatly exceeds 10% of the mean value, in fact is about 100% in the case of example 6.

These results are shown graphically in FIG. 3. The birefringence ranges for examples 2, 3 and 4 are connected by one straight line which indicates that in these experiments the tube length is always 1160 mm, while the results for examples 1, 5 and 6 are connected with another line indicated that the tube length is the same and equal to 200 mm. It is particularly surprising that good results can be obtained at a melt throughput of 3.6 g/min per filament (denier 11.5 dtex) with a spinning speed of 3100 m/min.

With the apparatus according to the invention, success has been achieved for the first time in producing filaments from PET at speeds of 2000 m/min and more with a filament denier of up to 11.5 dtex which are so regular that they can be further processed without any trouble.

The method according to the invention can be carried out with all known thermoplastic polymers, in particular with polyesters such as polyethylene terephthalate, polyamides such as polycaprolactam, polyhexamethylene adipamide and similar polyamides used in the textile sector, polyethylene, polypropylene and related polymers, polyacrylonitrile etc. It should be noted here that in case of applications of the invention for other polymers radially closed tube lengths of up to 2000 mm may be required.

While the invention has been illustrated and described as embodied in an apparatus and method for cooling melt-spun filaments, it is not intended to be limited to the details shown, since various modifications may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:
1. Apparatus for cooling, stabilizing and preparing melt-spun filaments, comprising
    means for making an annular bundle of melt-spun filaments with a melt throughput rate of not less than 1.1 g/min per filament;
    means for blowing air through the annular bundle of melt-spun filaments from a center position located inside the annular bundle of melt-spun filaments to cool the melt-spun filaments and thus to form cooled filaments;
    means for applying a preparation agent to the cooled filaments to form cooled prepared filaments;
    a radially closed hollow tube connecting the means for applying the preparation agent and the means for blowing air, said radially closed hollow tube having open ends and a length of from 200 to 2000 mm to space the means for applying the preparation agent from the means for blowing air;
    means for guiding said air to said means for blowing air through the radially closed hollow tube and the means for applying the preparation agent; and
    means for controlling a spinning speed of the melt-spun filaments and a filament denier of the melt-spun filaments so that the product of the spinning speed and the square root of the filament denier is between 5000 and 20000 (m/min dtex$^{1/2}$) to produce said cooled prepared filaments with a birefringence not varying from a mean value by more than about 10%.

2. Apparatus as defined in claim 1, wherein said means for blowing air is a perforated cylindrical pipe and said perforated cylindrical pipe is connected with said radially closed hollow tube to receive and dispense said air from said radially closed hollow tube.

3. Apparatus as defined in claim 1, further comprising a conical casing surrounding the radially closed hollow tube and tapering toward said means for blowing air.

4. Apparatus as defined in claim 1, further comprising a perforated cylindrical casing surrounding the annular bundle of the melt-spun filaments, the means for blowing air and the radially closed hollow tube.

5. Apparatus as defined in claim 1, wherein said means for making said annular bundle of melt-spun filaments produces individual filaments having equal filament denier values.

6. Apparatus as defined in claim 1, wherein said radially closed hollow tube is cylindrical.

7. Apparatus as defined in claim 1, wherein said means for making the annular bundle of the melt-spun filaments comprises a spinneret assembly, and further comprising a centering mandrel extending from the blowing air dispensing means and engaged in a central bore provided in the spinneret assembly.

8. Apparatus as defined in claim 1, wherein said means for applying the preparation agent to said cooled filaments applies the preparation agent to the cooled filaments at a distance of 220 mm from a downstream end of the radially closed hollow tube and said blowing air dispensing means comprises a porous tube having a length of 530 mm.

* * * * *